(No Model.)

W. C. EDGE.
CHAIN.

No. 431,804. Patented July 8, 1890.

WITNESSES:
Gustave Dieterich
William Goebel

INVENTOR
William C. Edge
BY Briesen & Knauth
ATTORNEYS.

UNITED STATES PATENT OFFICE.

WILLIAM C. EDGE, OF NEWARK, NEW JERSEY.

CHAIN.

SPECIFICATION forming part of Letters Patent No. 431,804, dated July 8, 1890.

Application filed April 3, 1890. Serial No. 346,408. (No model.)

*To all whom it may concern:*

Be it known that I, WILLIAM C. EDGE, a resident of Newark, Essex county, New Jersey, have invented an Improvement in Chains, of which the following is a specification, reference being had to the accompanying drawings, forming a part thereof, wherein—

Figure 1:
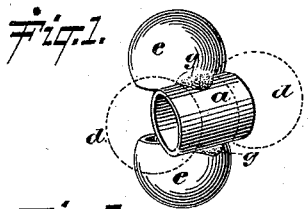
Figure 2:
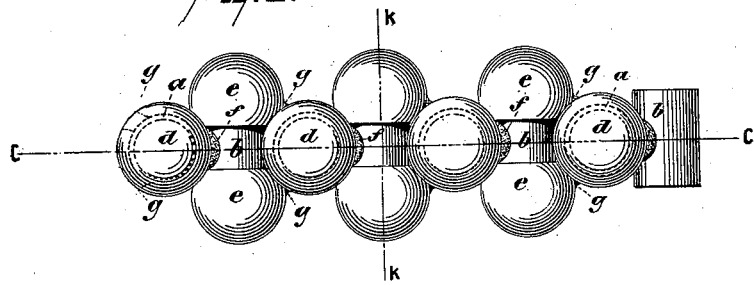
Figure 3:
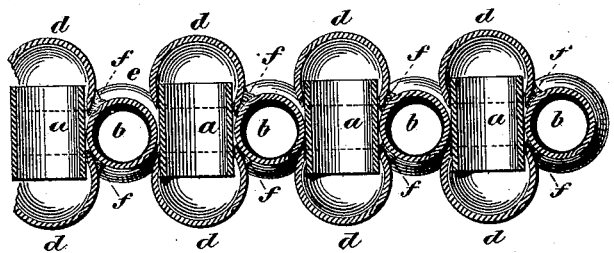
Figure 4:
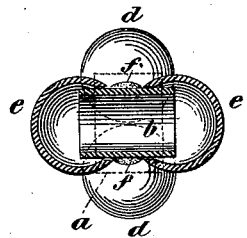

Figure 1 represents a perspective view of one link of my improved chain. Fig. 2 is a face view of the chain; Fig. 3, a longitudinal section on the line $c\ c$, Fig. 2; and Fig. 4, a cross-section on the line $k\ k$, Fig. 2, all the figures being shown on an enlarged scale.

This invention relates to a new construction of chain for ornamental purposes; and it consists in constructing the chain of pieces of tubing combined with ornamental caps, the ornamental caps of one piece of tubing being united to the adjoining piece of tubing, the short tubes standing at right angles to each other alternately, as hereinafter more fully shown.

In the accompanying drawings, the letters $a\ a$ represent short pieces of tubing made of gold or analogous material and all placed parallel with one another, as in Fig. 3. $b\ b$ are equally or about equally short pieces of tubing placed at right angles to the tubes $a$, as also appears from Fig. 3. The ends of each tube $a$ are covered by ornamental caps $d$ of suitable form, and the ends of the tubes $b$ are covered by ornamental caps $e$, also of suitable form. The caps $d$ are, by soldering, as at $f$, united to one of the tubes $b$, between which they are placed, and in like manner the caps $e$ are, by solder $g$ or analogous fastening, united to one of the adjoining tubes $a$, between which they are placed. Thus, as in Fig. 1, each tube is rigidly connected with a pair of caps that cover the adjoining tube placed at right angles, and this in turn is united to the set of caps for covering the next adjoining tube, &c.; or, in other words, the entire chain is made up of links such as are shown in Fig. 1, each link consisting of a piece of tubing having attached to it ornamental caps that are adapted to fit over another piece of tubing that stands at right angles to the first. By this simple construction a very ornamental and showy chain can be quickly constructed by almost any ordinary mechanic, no intricate work being required in its make up.

Having now described my invention, what I claim is—

The chain consisting of series of tubes $a\ b$, that are placed at right angles to each other, each tube having rigidly attached to it the caps that cover the ends of one of the adjoining tubes, substantially as herein shown and described.

WM. C. EDGE.

Witnesses:
W. B. ADAMS,
F. N. JOHNSON.